(12) United States Patent  (10) Patent No.: US 7,450,275 B2
Nishina  (45) Date of Patent: Nov. 11, 2008

(54) DOCUMENT READING LENS, DOCUMENT READING LENS UNIT, DOCUMENT READER, AND IMAGE FORMING APPARATUS

(75) Inventor: Kiichiro Nishina, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 989 days.

(21) Appl. No.: 10/874,287

(22) Filed: Jun. 24, 2004

(65) Prior Publication Data

US 2004/0264008 A1 Dec. 30, 2004

(30) Foreign Application Priority Data

Jun. 24, 2003 (JP) ............................. 2003-179756

(51) Int. Cl.
*H04N 1/04* (2006.01)
*H04N 1/46* (2006.01)
*H04N 1/60* (2006.01)

(52) U.S. Cl. ..................... 358/474; 358/475; 358/505; 358/1.9

(58) Field of Classification Search ................. 358/474, 358/475, 505, 1.9; 350/464; 359/756
See application file for complete search history.

(56) References Cited

U.S. PATENT DOCUMENTS

| | | | |
|---|---|---|---|
| 4,690,518 A | | 9/1987 | Kouchiwa et al. |
| 4,738,517 A | * | 4/1988 | Nishina et al. ............... 359/758 |
| 4,753,522 A | | 6/1988 | Nishina et al. |
| 4,836,664 A | | 6/1989 | Nishina |
| 4,997,265 A | | 3/1991 | Nishina |
| 5,311,364 A | * | 5/1994 | Kanoshima et al. .......... 359/756 |
| 5,680,254 A | | 10/1997 | Ueda et al. |
| 5,781,324 A | | 7/1998 | Nishina |
| 6,718,132 B2 | | 4/2004 | Nishina |
| 6,831,794 B2 | * | 12/2004 | Schuster et al. .............. 359/708 |

FOREIGN PATENT DOCUMENTS

| | | |
|---|---|---|
| JP | 6-342120 | 12/1994 |
| JP | 8-146292 | 6/1996 |
| JP | 9-113802 | 5/1997 |
| JP | 9-171136 | 6/1997 |
| JP | 9-304696 | 11/1997 |
| JP | 10-333029 | 12/1998 |

OTHER PUBLICATIONS

U.S. Appl. No. 09/946,482, filed Sep. 6, 2001.
U.S. Appl. No. 06/637,941, filed Nov. 21, 1984.
U.S. Appl. No. 07/004,843, filed Jan. 12, 1987.
U.S. Appl. No. 07/574,100, filed Aug. 29, 1990.
U.S. Appl. No. 10/631,744, filed Aug. 10, 2003, Nishina.
U.S. Appl. No. 10/633,724, filed Aug. 5, 2003, Nishina.
U.S. Appl. No. 10/874,287, filed Jun. 24, 2004, Nishina.

* cited by examiner

*Primary Examiner*—Houshang Safaipour
(74) *Attorney, Agent, or Firm*—Oblon, Spivak, McClelland, Maier & Neustadt, P.C.

(57) ABSTRACT

A lens for reading an image of a document includes three positive lenses, three negative lenses, a diaphragm, and at least one cemented lens that includes one of the positive lenses and one of the negative lenses cemented together. The document reading lens includes at least one aspheric surface. The lens adjacent to the diaphragm has the aspherical surface, and at least one cemented lens is arranged to be adjacent to the diaphragm.

14 Claims, 11 Drawing Sheets

DOCUMENT READING LENS, DOCUMENT READING LENS UNIT, DOCUMENT READER, AND IMAGE FORMING APPARATUS

CROSS-REFERENCE TO RELATED APPLICATIONS

The present document incorporates by reference the entire contents of Japanese priority document, 2003-179756 filed in Japan on Jun. 24, 2003

BACKGROUND OF THE INVENTION

1) Field of the Invention

The present invention relates to a document reading lens, a document reading lens unit, a document reader, and an image forming apparatus.

2) Description of the Related Art

A digital copier or a facsimile machine reads a document and converts an image of the document thus read to a signal. It is a document reading lens that forms the image of the document on a light reception unit of an imaging unit such as a charge coupled device (CCD).

As the document reading lens, a Gauss-type lens that includes six lenses in four groups is widely used. While the Gauss-type lens suppresses occurrence of a comatic flare even if an aperture of the lens is large, most of Gauss-type lenses have a half angle of view of about 18 degrees.

The Gauss-type lenses having relatively wide angles of view are disclosed in, for example, Japanese Patent Application Laid-Open No. H6-342120, Japanese Patent Application Laid-Open No. H8-146292, Japanese Patent Application Laid-Open No. H9-113802, Japanese Patent Application Laid-Open No. H9-171136, and Japanese Patent Application Laid-Open No. H9-304696. The widest angle of view of these lenses is about 20 degrees.

As a document reading lens of a type other than the Gauss-type, there is known a modified Xenor-type lens that includes six lenses in four groups similarly to the Gauss-type lens, for example, see Japanese Patent Application Laid-Open No. H10-333029. However, the disclosed lens has a half angle of view up to 17.6 degrees at the most.

If the angle of view of the document reading lens is narrow, an optical path length from the document to the imaging unit cannot be reduced and a reduction in the size of a document reader is difficult to achieve.

SUMMARY OF THE INVENTION

It is an object of the present invention to solve at least the problems in the conventional technology.

A document reading lens for reading an image of a document, according to an aspect of the present invention, includes three positive lenses; three negative lenses; a diaphragm; and at least one cemented lens in which one of the positive lenses and one of the negative lenses are cemented together. The document reading lens includes one or more aspherical surfaces, the lens adjacent to the diaphragm has the aspherical surface, and at least one cemented lens is arranged to be adjacent to the diaphragm.

A document reading lens unit according to another aspect of the, present invention includes the document reading lens according to the present invention as is integrally assembled with a lens barrel.

A document reader for reading a document according to still another aspect of the present invention includes a document support unit that supports the document; an illumination unit that illuminates the document supported by the, document support unit; a document reading lens that forms an image of the illuminated document, the document reading lens according to the present invention; and an imaging unit that receives the image of the document formed by the document reading lens, and that coverts the image of the document to an electric signal.

An image forming apparatus according to still another aspect of the present invention includes the document reader according to the present invention.

The other objects, features, and advantages of the present invention are specifically set forth in or will become apparent from the following detailed description of the invention when read in conjunction with the accompanying drawings.

DETAILED DESCRIPTION

Figure 1:
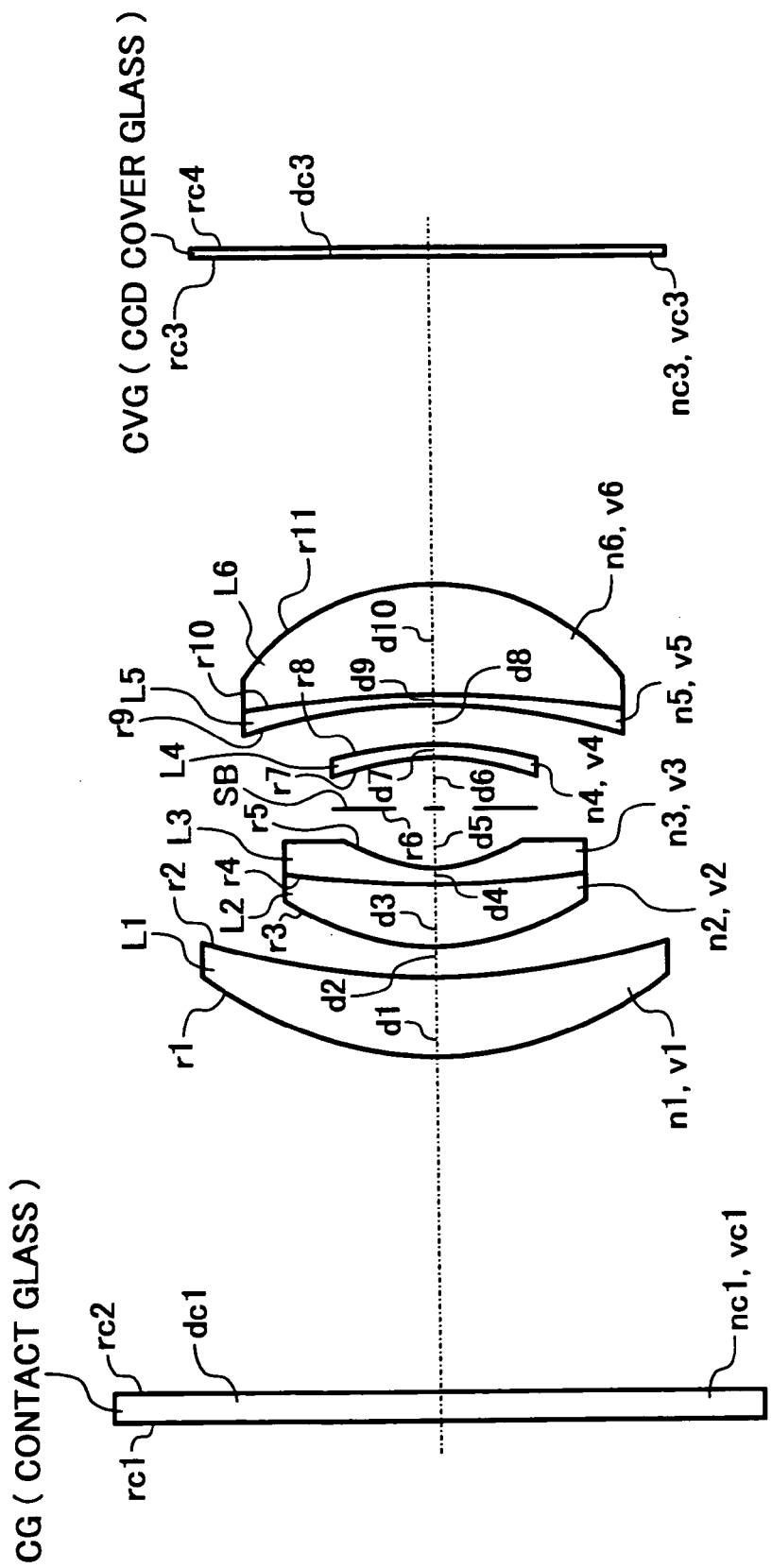
FIG. 1 depicts the configuration of a document reading lens.

A document reading lens according to the present invention is a lens for reading an image of a document. Namely, the document reading lens is a lens for forming a reduced image of the document image on a light reception unit of an imaging unit.

The document reading lens has the following features. Namely, the document reading lens includes three positive lenses, three negative lenses, and a diaphragm. Namely, the number of constituent lenses of the document reading lens is six. The document reading lens includes at least one cemented lens in which one of the positive lenses and one of the negative lenses are cemented together. One lens surface or more are aspherical surfaces. The lens adjacent to the diaphragm has the aspherical surface, and at least one of the cemented lenses is arranged to be adjacent to the diaphragm.

Moreover, the document reader according to the present invention includes a document support unit; an illumination unit; a document reading lens; and an imaging unit. The document support unit supports the document to be read. The illumination unit illuminates the document supported by the document support unit. The document reading lens forms an image of the illuminated document. The imaging unit receives the image of the document formed by the document reading lens, and coverts the image of the document to an electric signal.

In the document reader according to the present invention, the illumination unit illuminates and scans the document fixedly mounted on the contact glass in a plane. Alternatively, the document reader may be constituted to fix a positional relationship among the illumination unit, the document reading lens, and a line sensor, and illuminate and scan the document while putting the document to be read on a contact glass provided at a position conjugate to the line sensor and illuminating the original in a form of a slit, and moving the document in a direction crossing a slit-like illumination position. The contact glass in the alternative suffices to have a small width necessary to illuminate the document.

The document reader can further be constituted to fixedly mount the document to be read on a document glass in a plane, illuminate entire surface of the document with a predetermined illumination distribution, cause the document reading lens to form a reduced image of the entire surface of the document on a light reception surface of an area sensor, and simultaneously read the entire surface of the document.

Writing of the image by the image forming apparatus according to the present invention can be carried out by various well-known methods such as an inkjet method, an ink ribbon method, and a thermosensitive method. The writing of the image corresponding to the image signal can be carried out by optical writing. The writing of the image by the optical writing may be carried out to a silver salt film or the like. An electrostatic latent image corresponding to the image to be formed can be formed on a photoconductive, photosensitive body by the optical writing.

Moreover, the document reading lens includes three positive and three negative lenses, that is, six lenses in total. A combination of the three positive and the three negative lenses enables widening an angle of view, and satisfactorily correcting various aberrations. Further, by containing a cemented lens for the positive and the negative lenses in the document reading lens, good chromatic aberration correction can be made. Besides, by adopting one or more aspherical surfaces, a high performance can be realized.

An aspherical lens is generally manufactured by molding. However, if an outside diameter of the lens is larger, more facilities-related constraints such as an increase in a size of a molding machine used for molding the aspherical lens are imposed. In addition, if the outside diameter of the lens is larger, a molding time is longer, thereby not only causing a cost hike of the aspherical lens but also making it difficult to maintain a high accuracy for lens surfaces. This results in deterioration of an imaging performance of the document reading lens.

The document reading lens has the aspherical surface formed on the lens adjacent to the diaphragm the outside diameter of which can be made the smallest among all the lenses. It is thereby possible to effectively avoid the constraints, the cost hike, and the deterioration in the accuracy for the lens surfaces when the aspherical lens having the aspherical surface is manufactured.

The document reading lens includes at least one cemented lens for chromatic aberration correction. For example, if the document is read in full colors, it is necessary to satisfactorily correct the chromatic aberration of the document reading lens. In making the correction, by arranging the cemented lens for the chromatic aberration correction to be adjacent to a position of the diaphragm at which an imaging optical flux is minimized in the lens, a good chromatic aberration correction can be made.

The respective lenses are arranged substantially symmetric about the diaphragm. This arrangement can facilitate making good corrections particularly to an image surface curvature or curvature aberration, a chromatic aberration related to a magnification, and the like.

A lens formation that facilitates realizing such arrangement of lenses is that of the document reading lens, wherein the first lens is a positive meniscus lens arranged to direct a convex surface to the object side, the second lens is a positive meniscus lens arranged to direct a convex surface to the object side, the third lens is a negative meniscus lens arranged to direct a convex surface to the object side, the fourth lens is a negative meniscus lens arranged to direct a concave surface to the object side, the fifth lens is a negative meniscus lens arranged to direct a concave surface to the object side, and the sixth lens is a positive meniscus lens arranged to direct a concave surface to the object side.

By thus forming all the lenses into meniscus lenses, various aberrations can be satisfactorily corrected while making a lens system compact.

The condition (1) relates to a favorable range of the power of the first group. By setting a parameter f1/f lower than an upper limit of 1.2, a reduction in the power of the first group, an increase in the size of the lens, and a cost hike can be avoided. By setting the parameter higher than a lower limit of 0.9, an increase in a comatic flare can be avoided.

The condition (2) relates to a favorable range of the combined power of the second and the third groups each having the negative power. By setting a parameter f23/f lower than an upper limit of −1.1, excessive corrections to a spherical aberration and an image surface curvature and deterioration in a comatic aberration in surroundings can be avoided. By setting the parameter higher than a lower limit of −1.6, insufficient corrections to the spherical aberration and the image surface curvature, an increase in astigmatism at an intermediate angle of view, and the deterioration in the comatic aberration at the intermediate angle of view can be avoided.

That is, if the condition (2) is satisfied, then the spherical aberration and the image surface curvature can be corrected satisfactorily, the increase in astigmatism at the intermediate angle of view can be suppressed, and the comatic aberration up to intermediate and peripheral areas can be satisfactorily maintained.

The condition (3) relates to a favorable range of refractive indices of the convex lenses and the concave lenses that constitute the document reading lens. If a parameter (n convex)-(n concave) satisfies the condition (3), then an excess of a Petzval sum (when the Petzval sum is higher than an upper limit of 0.0) or an insufficiency of the Petzval sum (when the Petzval sum is lower than a lower limit of −0.1) can be avoided, the image surface curvature and the astigmatism can be satisfactorily corrected, and a good imaging performance can be attained over the entire image surface.

The condition (4) relates to a good correction to a chromatic aberration on an axis. By setting a parameter (ν convex)-(ν concave) lower than an upper limit of 20.0, an excessive correction to the chromatic aberration on the axis can be avoided, and a positive-side increase in the chromatic aberration on the axis on a smaller wavelength side than a main wavelength can be, therefore, avoided. By setting the parameter higher than a lower limit of 17.0, an insufficient correction to the chromatic aberration on the axis can be avoided and a negative-side increase in the chromatic aberration on the axis on the smaller wavelength side than the main wavelength can be, therefore, avoided. That is, if the condition (4) is satisfied, the chromatic aberration on the axis can be satisfactorily corrected.

The condition (5) relates to an effective reduction in deterioration of a quantity of light in the surroundings. If a wide-angle document reading lens having a half angle of view exceeding 23 degrees to be explained later in examples is used, a so-called pupil aberration causes deterioration in aperture efficiency even if surrounding optical flux passes the aperture diaphragm at the fullest. The quantity of light in the surroundings decreases relative to that on the axis according to the aperture efficiency and a so-called cosine fourth law.

Exemplary embodiments of a document reading lens will be explained hereinafter.

FIG. 1 depicts the configuration of a lens common to the respective examples. In FIG. 1, a left side is a document side, and a reference symbol CG denotes a contact glass. A right-side is an imaging unit side, and a reference symbol CVG denotes a cover glass of a CCD line sensor serving as an imaging unit.

A reference symbol L1 denotes a first lens (positive lens), L2 denotes a second lens (positive lens), L3 denotes a third lens (negative lens), SB denotes a diaphragm, L4 denotes a fourth lens (negative lens), L5 denotes a fifth lens (negative lens), and L6 denotes a sixth lens (positive lens). The second lens L2 and the third lens L3 are cemented together to constitute a second group, whereas the fifth lens L5 and the sixth lens L6 are cemented together to constitute a fourth group.

The meanings of the symbols used in the explanation are as follows:
f: Combined focal length of the whole system relative to an e ray
FNo: F number
m: Scale factor
ω: Half angle of view (in degrees)
Y: Object height
AE: Aperture efficiency
i: $i^{th}$ surface (including a surface of the diaphragm) from the object side of the document reading lens
ri (i=1 to 11): Radius of curvature of the $i^{th}$ surface (including a surface of the diaphragm) from the object side
di (i=1 to 10): Surface distance between the $i^{th}$ surface and an $(i+1)^{th}$ surface from the object side
c1: Document side surface of the contact glass
c2: Image side surface of the contact glass
c3: Document side surface of the cover glass of the CCD serving as the imaging unit
c4: Image side surface of the cover glass of the CCD serving as the imaging unit
nd: Refractive index relative to a d ray
ne: Refractive index relative to an e ray
νd: Abbe number
f1: Focal length of the first lens relative to the e ray
n convex: Average nd of lenses each having a positive refractive power
n concave: Average nd of lenses each having a negative refractive power
ν convex: Average νd of lenses each having the positive reflective power
ν concave: Average νd of lenses each having the negative reflective power The aspherical surface is expressed by:

$$X=\{(1/R)\times Y^2\}/[1+\sqrt{\{(1-(1+K)\times(Y/R)^2)\}}]+A4\times Y^4+A6\times Y^6+A8\times Y^8+A10\times Y^{10},$$

where the meanings of symbols are as follows:
X: Distance of an apex of the aspherical surface from a tangential plane at a height Y from an optical axis
Y: Height from the optical axis
R: Paraxial radius of curvature of the aspherical surface
K: Conic coefficient
A4, A6, A8, A10: Aspherical coefficients
E-XY: $10^{-XY}$.

In aberration diagrams, meanings of symbols are as follows:
e: e ray (546.07 nanometers)
g: g ray (436.83 nanometers)
c: c ray (656.27 nanometers)
F: F ray (486.13 nanometers).

In spherical aberration diagrams, a broken line relative to the e ray denotes a sine condition, in astigmatism diagrams, a solid line denotes a sagittal ray and a broken line denotes a meridional ray are shown.

FIRST EXAMPLE f=66.650, F=4.99, m=0.23622, Y=152.4, ω=23.6°, AE=81.0%, ω×AE=19.12

Table 1 depicts data according to a first example.

TABLE 1

|  | R | D | Nd | νd | Ne |
|---|---|---|---|---|---|
| C1 | 0.000 | 3.200 | 1.51680 | 64.2 | 1.51872 |
| C2 | 0.000 |  |  |  |  |
| 1 | 29.682 | 8.930 | 1.83400 | 37.34 | 1.83930 |
| 2 | 63.916 | 0.306 |  |  |  |
| 3 | 25.248 | 8.869 | 1.69680 | 55.46 | 1.69980 |
| 4 | 95.899 | 1.500 | 1.76182 | 26.61 | 1.76857 |
| 5 | 14.170 | 6.860 |  |  |  |
| 6 | 0.0 (diaphragm) | 5.033 |  |  |  |
| 7 | −23.945 | 1.524 | 1.73077 | 40.5 | 1.73505 |
| 8 | −28.541 | 4.913 |  |  |  |
| 9 | −45.856 | 1.500 | 1.84666 | 23.78 | 1.85505 |
| 10 | −85.231 | 13.308 | 1.72916 | 54.67 | 1.73234 |
| 11 | −21.216 |  |  |  |  |
| C3 | 0.000 | 1.000 | 1.51680 | 64.2 | 1.51872 |
| C4 | 0.000 |  |  |  |  |

Aspherical Coefficients

Table 2 depicts aspherical coefficients for a document reading lens according to the first example.

TABLE 2

| Surface Number | K | A4 | A6 | A8 | A10 |
|---|---|---|---|---|---|
| 7 | 3.20923 | −1.00808E−06 | −5.02298E−08 | 8.17057E−10 | −9.07557E−12 |

Parameters for Conditions

Table 3 depicts respective parameters for conditions for the document reading lens according to the first example.

TABLE 3

| Term | f1 | f23 | f1/f | F23/f | n convex-n concave | ν convex-ν concave |
|---|---|---|---|---|---|---|
| Numeric value | 59.005 | −47.421 | 1.130 | −1.405 | −0.026430 | 18.86 |

Figure 2:
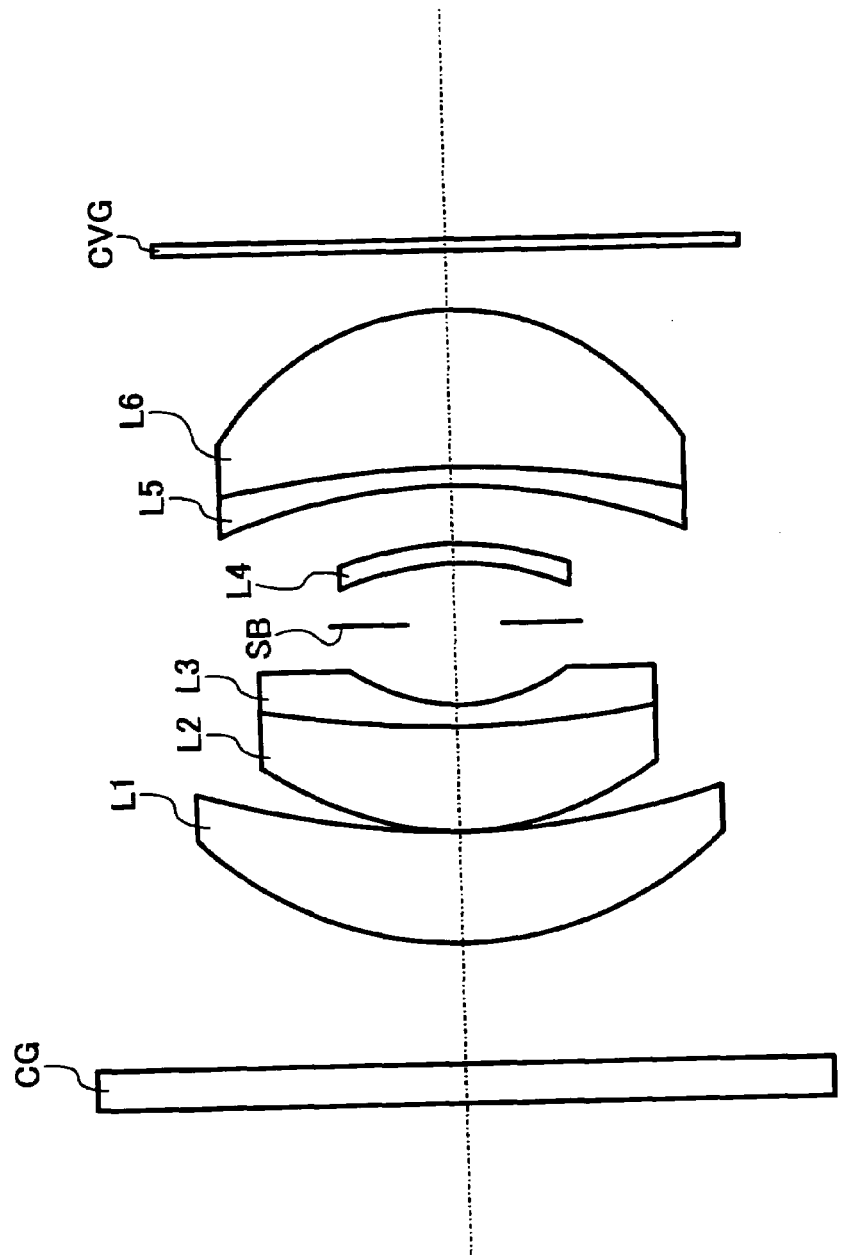
FIG. 2 depicts the configuration of a document reading lens according to a first example of the present invention.
Figure 3:
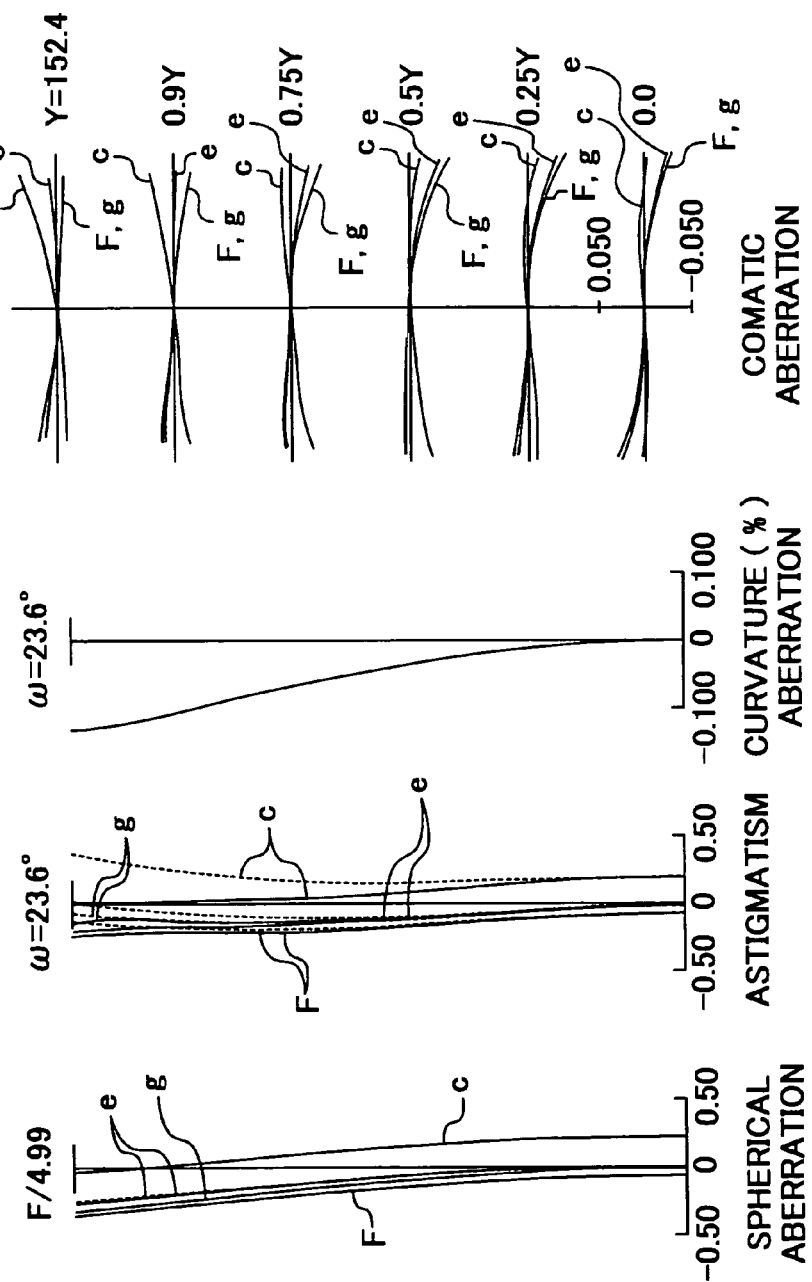
FIG. 3 depicts aberration diagrams according to the first example.

FIG. 2 is a shematic of the document reading lens according to the first example. FIG. 3 depicts aberration diagrams according to the first example.

SECOND EXAMPLE f=66.3353, F=5.04, m=0.23622, Y=152.4, ω=23.71°, AE=83.9%, ω×AE=19.88

Table 4 depicts data according to a second example.

TABLE 4

| | R | D | Nd | Nd | Ne |
|---|---|---|---|---|---|
| c1 | 0.000 | 3.200 | 1.51680 | 64.2 | 1.51872 |
| c2 | 0.000 | | | | |
| 1 | 27.990 | 6.780 | 1.88300 | 40.8 | 1.88815 |
| 2 | 50.214 | 4.813 | | | |
| 3 | 20.027 | 5.049 | 1.88300 | 40.8 | 1.88815 |
| 4 | 45.400 | 1.500 | 1.80518 | 25.46 | 1.81263 |
| 5 | 12.425 | 5.023 | | | |
| 6 | 0.0 (diaphragm) | 5.991 | | | |
| 7 | −30.035 | 1.500 | 1.84666 | 23.78 | 1.85505 |
| 8 | −39.088 | 4.667 | | | |
| 9 | −51.307 | 1.500 | 1.84666 | 23.78 | 1.85505 |
| 10 | −81.273 | 14.461 | 1.65844 | 50.85 | 1.66152 |
| 11 | −21.110 | | | | |
| c3 | 0.000 | 1.000 | 1.51680 | 64.2 | 1.51872 |
| c4 | 0.000 | | | | |

Aspherical Coefficients

Table 5 depicts aspherical coefficients for the document reading lens according to the second example.

TABLE 5

| Surface Number | K | A4 | A6 | A8 | A10 |
|---|---|---|---|---|---|
| 7 | 4.32048 | −2.57274E−06 | −7.12063E−09 | 1.81444E−10 | −2.24295E−12 |

Parameters for Conditions

Table 6 depicts respective parameters for conditions for the document reading lens according to the second example.

TABLE 6

| Term | f1 | F23 | f1/f | f23/f | n convex-n concave | ν convex-ν concave |
|---|---|---|---|---|---|---|
| Numeric value | 62.271 | −54.913 | 1.066 | −1.208 | −0.024687 | 19.81 |

Figure 4:
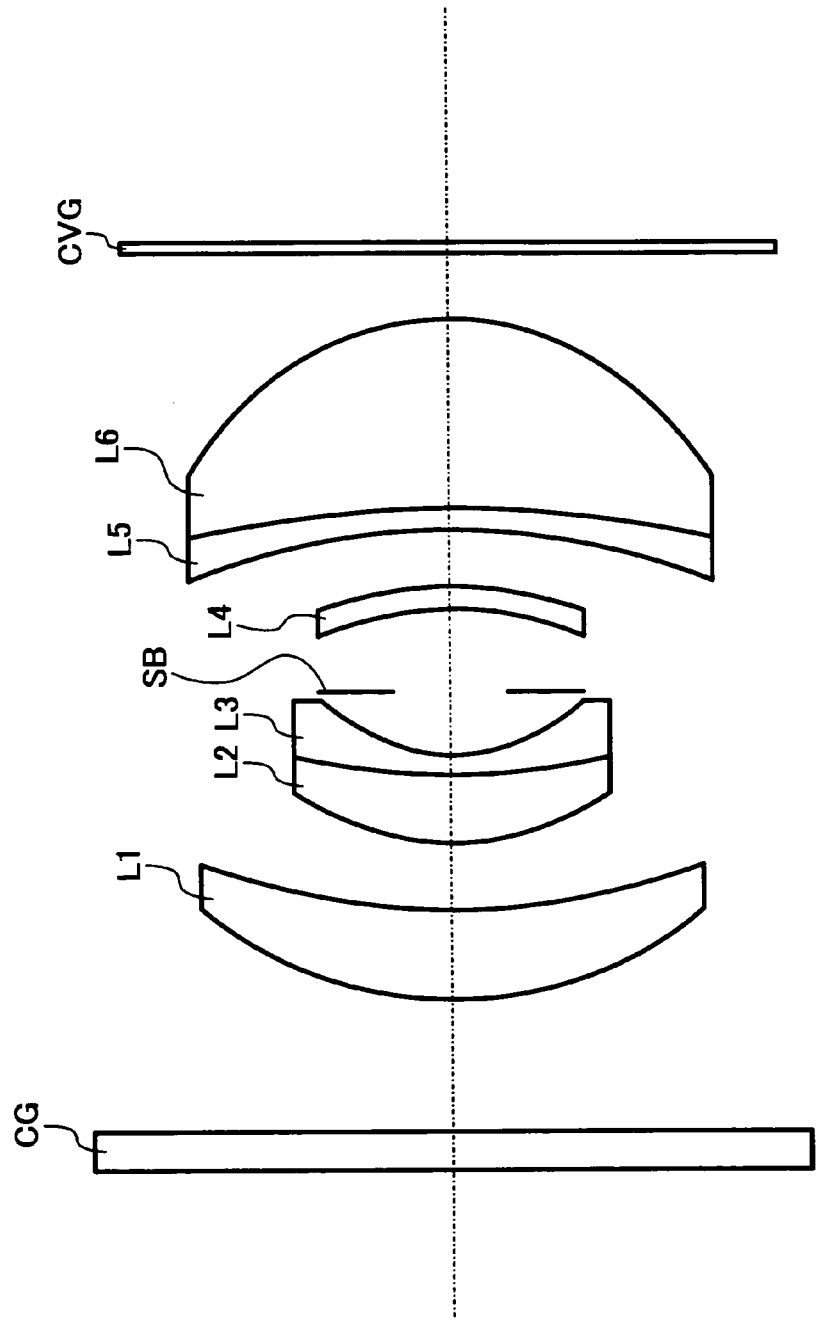
FIG. 4 depicts the configuration of a document reading lens according to a second example of the present invention.
Figure 5:
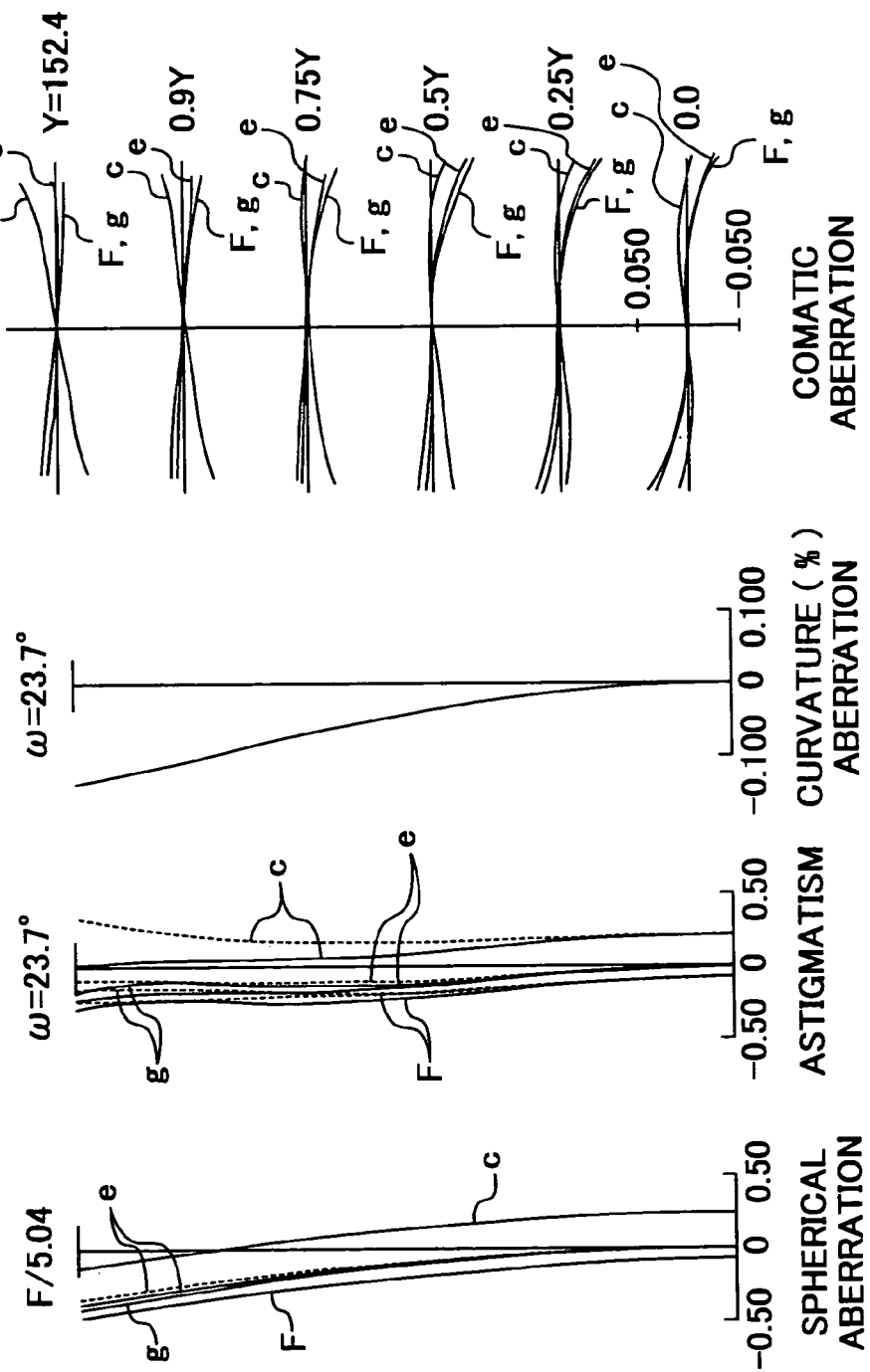
FIG. 5 depicts aberration diagrams according to the second example.

FIG. 4 is a schematic of the document reading lens according to the second example. FIG. 5 depicts aberration diagrams according to the second example.

THIRD EXAMPLE f=66.283, F=4.98, m=0.23622, Y=152.4, ω=23.7°, AE=83.5%, ω×AE=19.79

Table 7 depicts data according to a third example.

TABLE 7

| | R | D | Nd | Nd | Ne |
|---|---|---|---|---|---|
| c1 | 0.000 | 3.200 | 1.51680 | 64.2 | 1.51872 |
| c2 | 0.000 | | | | |
| 1 | 31.161 | 8.988 | 1.80610 | 33.27 | 1.81184 |
| 2 | 70.228 | 3.234 | | | |
| 3 | 22.506 | 7.007 | 1.71300 | 53.94 | 1.71615 |
| 4 | 123.541 | 1.500 | 1.76182 | 26.61 | 1.76857 |
| 5 | 12.813 | 6.576 | | | |
| 6 | 0.0 (diaphragm) | 5.499 | | | |
| 7 | −26.294 | 1.500 | 1.68893 | 31.16 | 1.69416 |
| 8 | −33.279 | 3.960 | | | |
| 9 | −49.907 | 1.500 | 1.84666 | 23.78 | 1.85505 |
| 10 | −74.040 | 12.047 | 1.71300 | 53.94 | 1.71615 |
| 11 | −20.358 | | | | |
| c3 | 0.000 | 1.000 | 1.51680 | 64.2 | 1.51872 |
| c4 | 0.000 | | | | |

Aspherical Coefficients

Table 8 depicts aspherical coefficients for the document reading according to the third example.

TABLE 8

| Surface Number | K | A4 | A6 | A8 | A10 |
|---|---|---|---|---|---|
| 7 | 4.07646 | 1.24279E−06 | 6.53010E−08 | −6.71611E−10 | 6.54857E−12 |

Parameters for Conditions

Table 9 depicts respective parameters for the conditions for the document reading lens according to the third example.

TABLE 9

| Term | f1 | F23 | f1/f | F23/f | n convex-n concave | ν convex-ν concave |
|---|---|---|---|---|---|---|
| Numeric value | 62.549 | −42.730 | 1.060 | −1.551 | −0.021770 | 19.87 |

Figure 6:
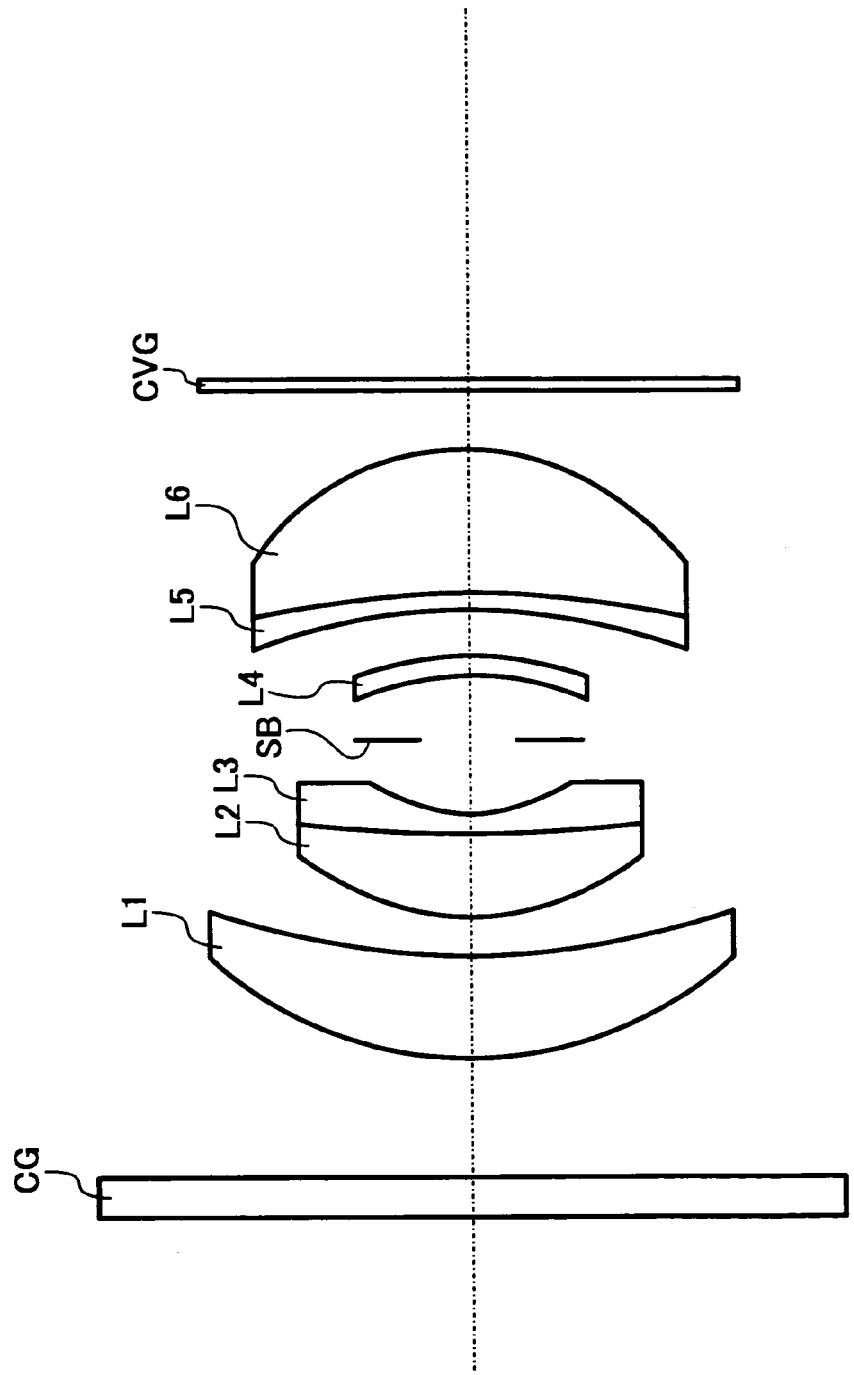
FIG. 6 depicts the configuration of a document reading lens according to a third example of the present invention.
Figure 7:
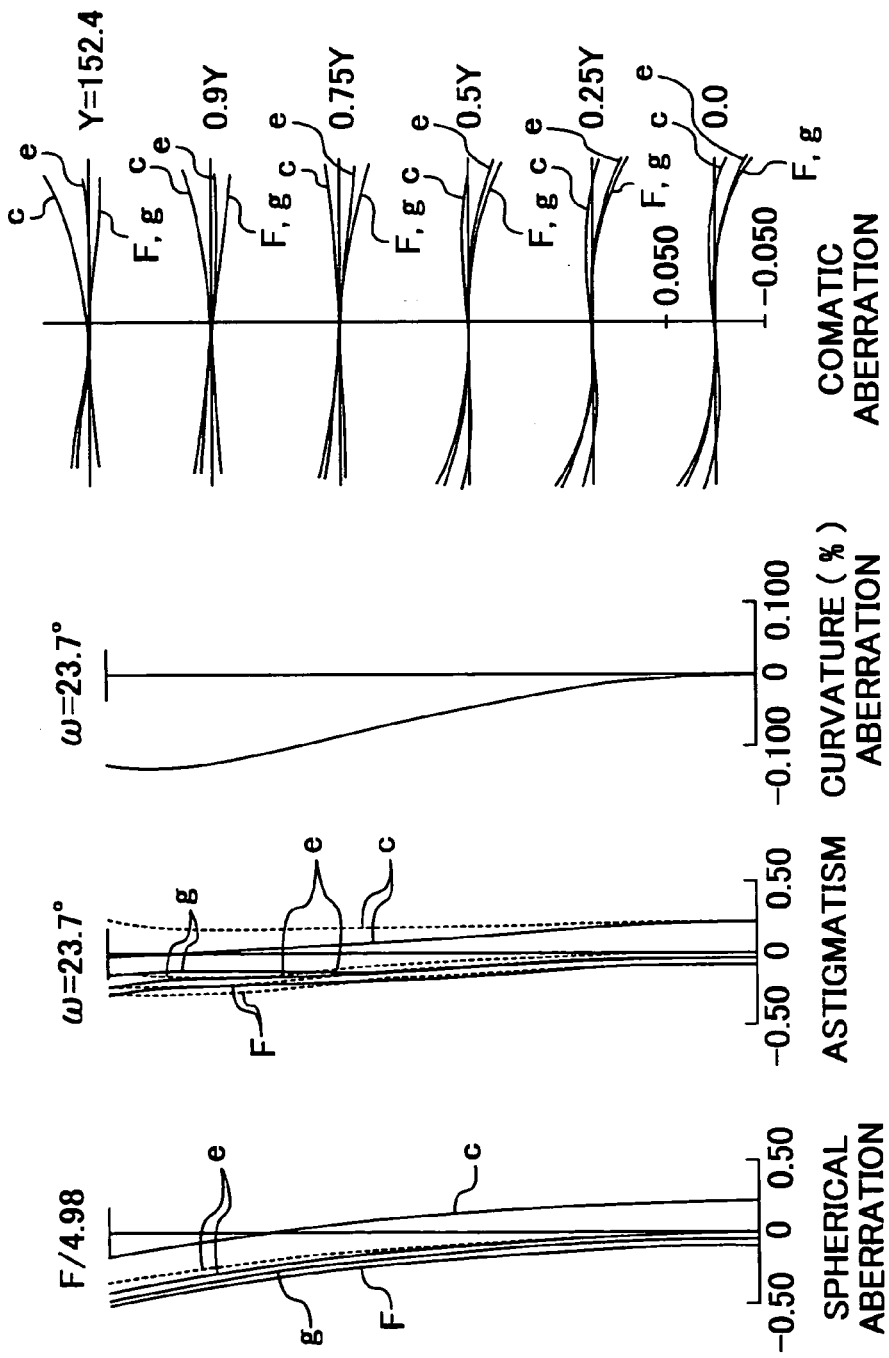
FIG. 7 depicts aberration diagrams according to the third example.

FIG. 6 is a schematic of the document reading lens according to the third example. FIG. 7 depicts aberration diagrams according to the third example.

FOURTH EXAMPLE f=67.107, F=4.99, m=0.23622, Y=152.4, ω=23.5°, AE=80.4%, ω×AE=18.89

Table 10 depicts data according to a fourth example.

TABLE 10

| | R | D | Nd | Nd | Ne |
|---|---|---|---|---|---|
| c1 | 0.000 | 3.200 | 1.51680 | 64.2 | 1.51872 |
| c2 | 0.000 | | | | |
| 1 | 37.597 | 11.104 | 1.80610 | 33.27 | 1.81184 |
| 2 | 92.691 | 5.284 | | | |
| 3 | 23.384 | 8.430 | 1.74400 | 44.9 | 1.74794 |
| 4 | 354.805 | 1.500 | 1.80518 | 25.46 | 1.81263 |
| 5 | 13.374 | 6.930 | | | |
| 6 | 0.0 (diaphragm) | 4.784 | | | |
| 7 | −26.593 | 1.532 | 1.84666 | 23.78 | 1.85505 |
| 8 | −29.058 | 4.202 | | | |
| 9 | −45.905 | 1.500 | 1.80518 | 25.46 | 1.81263 |
| 10 | −79.405 | 12.137 | 1.74330 | 49.22 | 1.74690 |
| 11 | −20.646 | | | | |
| c3 | 0.000 | 1.000 | 1.51680 | 64.2 | 1.51872 |
| c4 | 0.000 | | | | |

Aspherical Coefficients

Table 11 depicts aspherical coefficients for the document reading lens according to the fourth example.

TABLE 11

| Surface Number | K | A4 | A6 | A8 | A10 |
|---|---|---|---|---|---|
| 7 | 3.42964 | 1.44059E−06 | −3.64007E−09 | 8.73006E−11 | −1.11630E−12 |

Parameters for Conditions

Table 12 depicts respective parameters for the conditions for the document reading lens according to the fourth example.

TABLE 12

| Term | f1 | F23 | f1/f | F23/f | n convex-n concave | ν convex-ν concave |
|---|---|---|---|---|---|---|
| Numeric value | 71.461 | −52.080 | 0.939 | −1.289 | −0.054540 | 17.56 |

Figure 8:
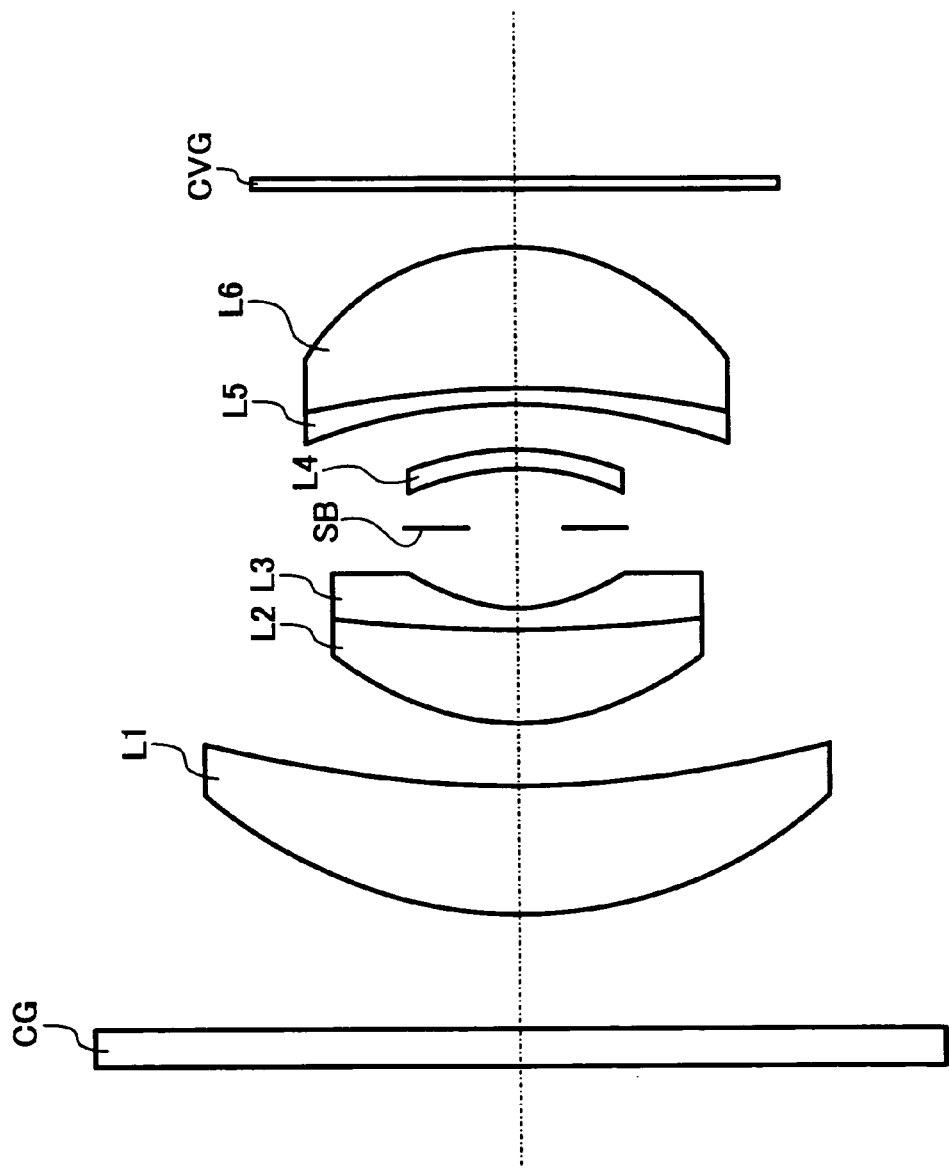
FIG. 8 depicts the configuration of a document reading lens according to a fourth example of the present invention.
Figure 9:
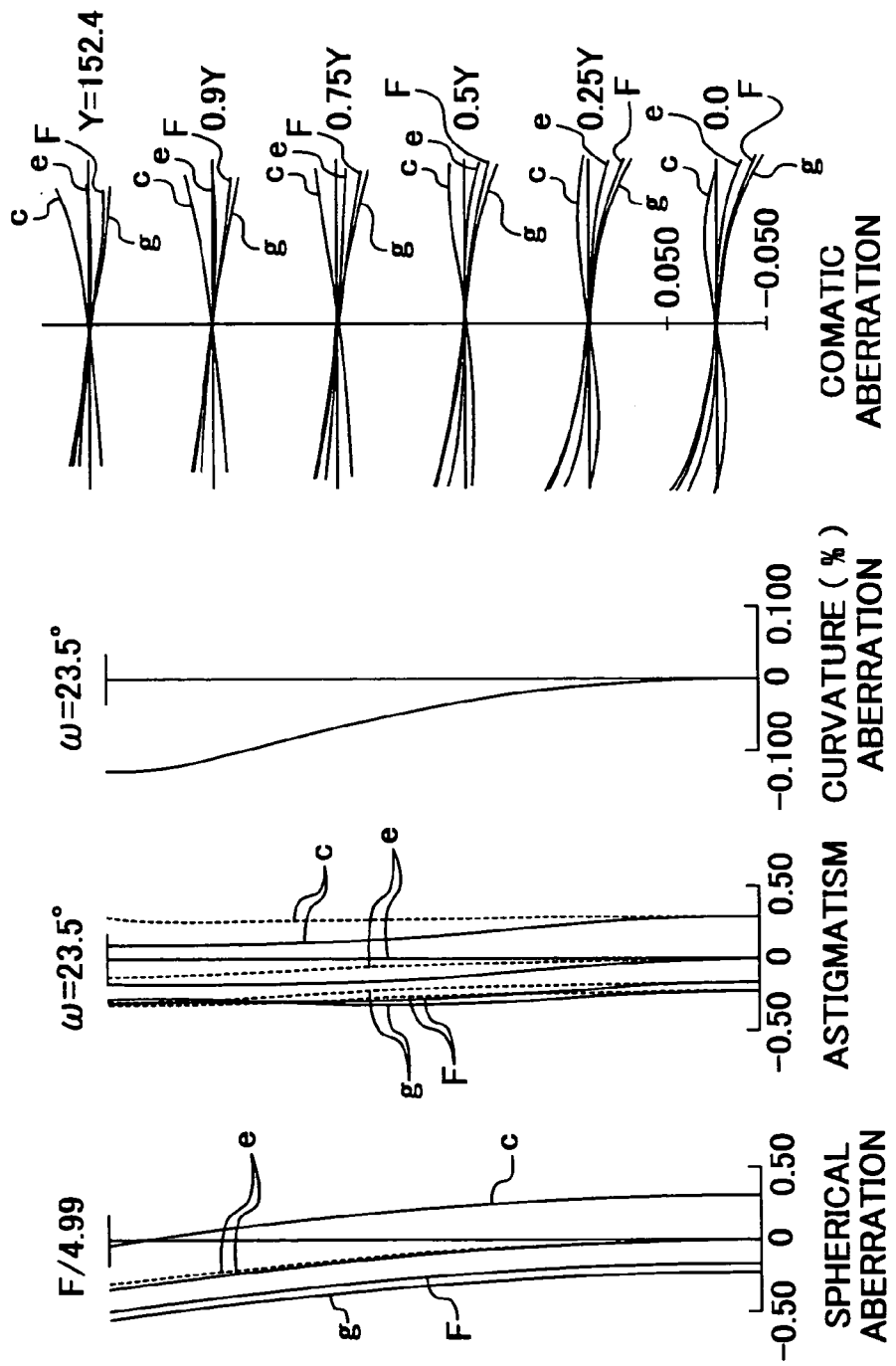
FIG. 9 depicts aberration diagrams according to the fourth example.

FIG. 8 is a schematic of the document reading lens according to the fourth example. FIG. 9 depicts aberration diagrams according to the fourth example.

Each of the document reading lenses according to the first to the fourth examples is a lens for reading the document image, including three positive lenses (L1, L2, and L6); three negative lenses (L3, L4, and L5); a diaphragm SB; and at least one cemented lens in which one of the positive lenses and one of the negative lenses are cemented together, in which the document reading lens includes one or more aspherical surfaces, the lens adjacent to the diaphragm SB has the aspherical surface, and at least one of the cemented lenses is arranged to be adjacent to the diaphragm.

The document reading lens includes the six lenses in four groups such that a first group including the first positive lens L1, a second group in which the second positive lens L2 and the third negative lens L3 are cemented together, and which has a negative refractive power as a whole, a third group including the fourth negative lens L4, and a fourth group in which the fifth negative lens L5 and the sixth positive lens L6 are cemented together, and which has a positive refractive power as a whole are sequentially arranged from the object side to the image side. The diaphragm SB is arranged between the second group and the third group. The first lens L1 is a positive meniscus lens arranged to direct a convex surface to the object side, and the second lens L2 is a positive meniscus lens arranged to direct a convex surface to the object side. The third lens L3 is a negative meniscus lens arranged to direct a convex surface to the object side, and the fourth lens L4 is a negative meniscus lens arranged to direct a concave surface to the object side. The fifth lens L5 is a negative meniscus lens arranged to direct a concave surface to the object side, and the sixth lens L6 is a positive meniscus lens arranged to direct a concave surface to the object side.

If a focal length of the first group relative to the e ray is f1, a combined focal length of the second group and the third group relative to the e ray is f23, and a combined focal length of the whole system relative to the e ray is f, the f1, the f23, and the f satisfy the following conditions (1) and (2):

$$0.9 < f1/f < 1.2 \quad (1)$$

$$-1.6 < f23/f < -1.1 \quad (2)$$

If an average refractive index of the three positive lenses L1, L2, and L6 relative to the d ray is an n convex, and an average refractive index of the three negative lenses L3, L4, and L5 relative to the d ray is an n concave, the n convex and n concave satisfy the following condition (3):

$$-0.1 < \text{n convex} - \text{n concave} < 0.0 \quad (3)$$

If an average Abbe number of the three positive lenses L1, L2, and L6 is a ν convex, and an average Abbe number of the three negative lenses L3, L4, and L5 is a ν concave, the ν convex and the ν concave satisfy the following condition (4):

$$17.0 < \text{ν convex} - \text{ν concave} < 20.0 \quad (4)$$

Further, if a half angle of view in degrees is ω and an aperture efficiency is AE, the ω and the AE satisfy the following condition (5):

$$18.5 < \omega \times AE \quad (5)$$

Figure 10:
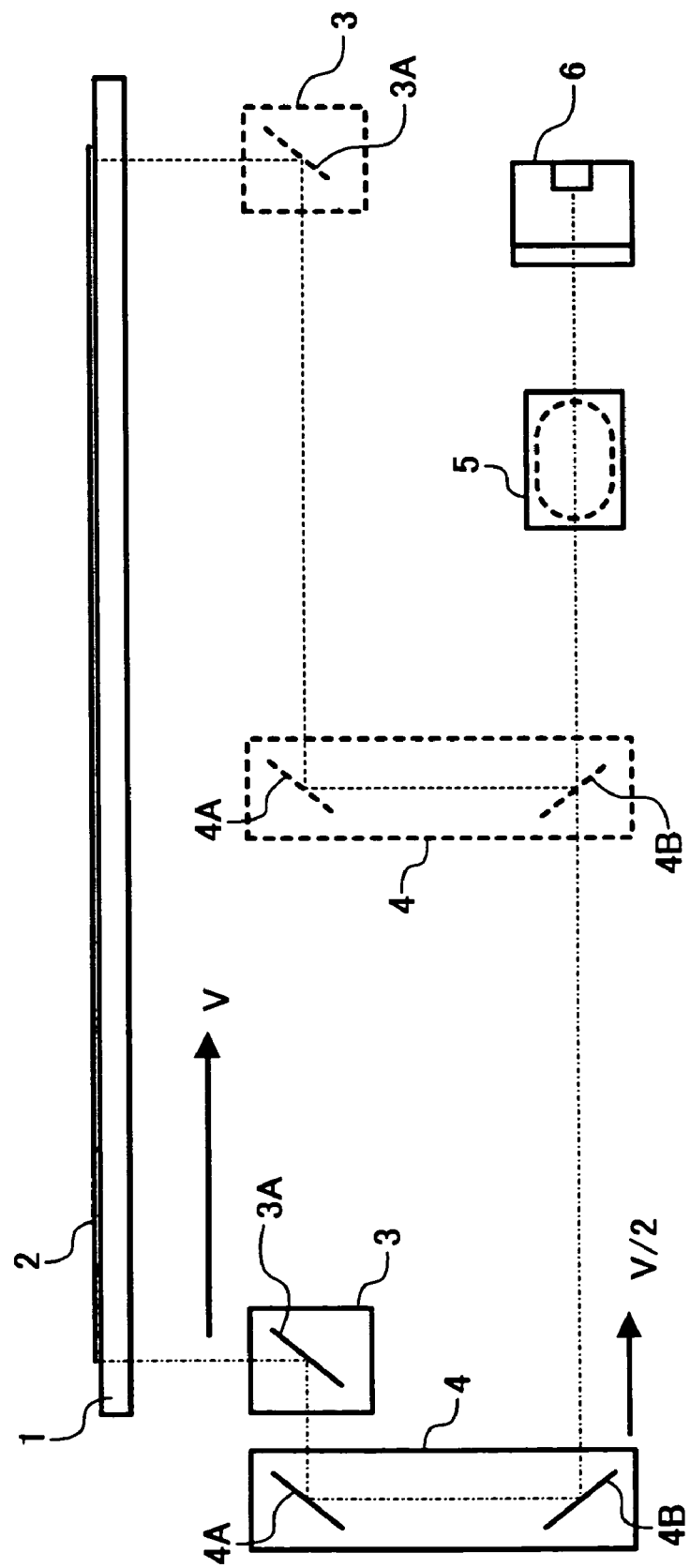
FIG. 10 is an explanatory view for one embodiment of a document reader.

FIG. 10 depicts only main parts of a document reader according to one embodiment of the present invention.

In FIG. 10, a document 2 to be read is fixedly mounted on a contact glass 1, which serves as a document support unit, in a plane, and an illumination optical system, not shown, arranged below the contact glass 1 illuminates a slit-like part of the document 2 long in a direction orthogonal to the figure.

A reflected light from the illuminated part of the document 1 is reflected by a first mirror 3A provided in a first traveling body 3, reflected sequentially by a second mirror 4A and a third mirror 4B provided in a second traveling body 4, and then passes through a document reading lens assembled into a lens barrel of a document reading lens unit 5, and is imaged on a light reception unit of a line sensor 6 that serves as an imaging unit, as a reduced image of the document image. As the document reading lens, any one of the document reading lenses according to the first to the fourth examples of the document reading lens, for example, is used.

The first traveling body 3 and the second traveling body 4 are driven to travel by a driving unit, not shown, in arrow directions (right direction in the diagram). The first traveling body 3 travels at a velocity of V, and the second traveling body 4 travels at a velocity of V/2. By thus traveling, the first traveling body 3 and the second traveling body 4 are displaced to positions indicated by respective broken lines.

The illumination optical system, not shown, moves integrally with the first traveling body 3, and illuminates and scans the entire surface of the document 2 mounted on the contact glass 1. Since a moving velocity ratio of the first to the second traveling bodies is V:V/2, an optical path length between the illuminated and scanned part of the document 2 to the document reading lens is kept constant.

The line sensor 6, which is a CCD, converts the image of the document 2 to an image signal, following the illumination and scanning of the document 2. The document 2 is thus read.

Namely, the document reader shown in FIG. 10 reads a document, and includes: the document support unit 1 that supports the document 2; the illumination unit (that includes the illumination optical system, not shown, the first and the second traveling bodies 3 and 4, the first to the third mirrors 3A, 4A and 4B held by the traveling bodies, and the driving unit, not shown, that drives the traveling bodies 3 and 4 to travel) that illuminates the document 2 supported by the document support unit 1; the document reading lens (assembled into the lens barrel of the document reading lens unit 5) that forms an image of the illuminated document 2; and the imaging unit 6 that receives the image of the document 2 formed by the document reading lens, and that coverts the image of the document 2 to an electric signal, wherein the document reading lens according to the present invention is used as the document reading lens.

Further, the document support unit is the contact glass 1 fixedly mounting the document 2 in a plane, the illumination unit includes a unit that illuminates the document 2 mounted on the contact glass 1 in the form of a slit, and that scans the document 2 in a direction crossing a slit-like illuminated part, and the imaging unit is the line sensor 6.

Alternatively, the document reader can be constituted so that a document reading unit in which an illumination unit that illuminates the document 2 on the contact glass in the form of a slit, the line sensor, a plurality of mirrors forming an imaging optical path from a non-illuminated part of the document 2 to the line sensor, and a document reading lens arranged on the imaging optical path are integrated with one another, is driven to travel relatively to the document 2 by the driving unit, thereby reading and scanning the document.

The document reading lens can be arranged in a document feeder (a so-called an automatic document feeder (ADF)), and used as a lens for reading a rear surface of the document when both sides of the document 2 are to be read.

The document reader shown in FIG. 10 can include a color separation unit so that information on the document can be read in full colors.

To carry out color separation by the color separation unit, an appropriate method such as a method for separating a color to R (red), G (green), and B (blue) by selectively inserting a color separation prism or a filter between the document reading lens and the line sensor (CCD), a method including steps of sequentially turning on light sources of R, G, and B, and of illuminating the document, or a method for separating a color to three primary colors by forming a color image on a light reception surface using a three-line CCD in which three light reception elements having R, G, and B filters are arranged on one chip in lines.

Figure 11:
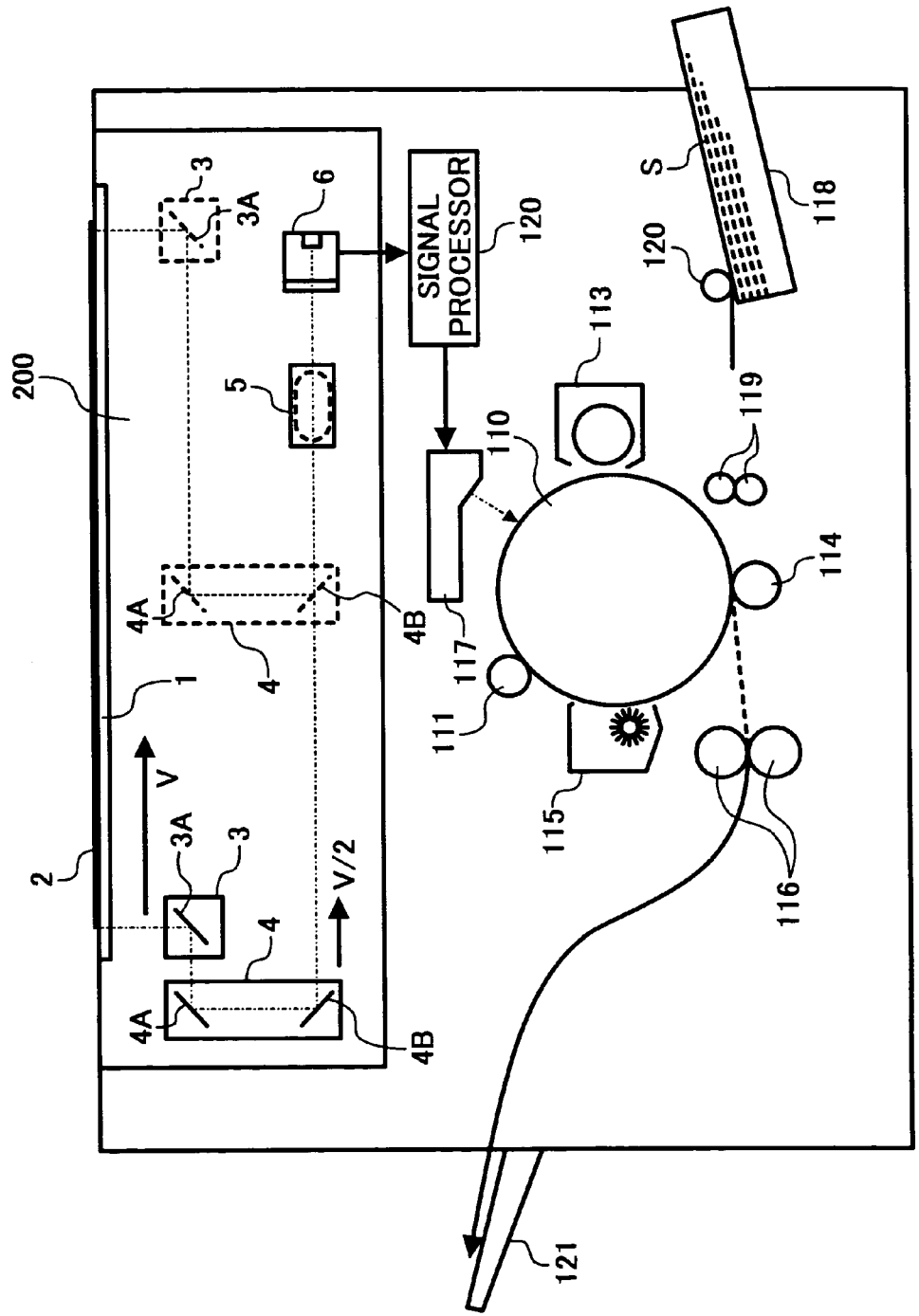
FIG. 11 is an explanatory view for one embodiment of an image forming apparatus.

FIG. 11 depicts an image forming apparatus according to one embodiment of the present invention.

This image forming apparatus includes a document reader 200 located in an upper portion of the apparatus, and an image formation unit located below the document reader 200. Constituent elements of the document reader 200 are the same as those explained with reference to FIG. 10, and therefore, like reference symbols denote like elements as those in FIG. 10, respectively.

An image signal output from the line sensor (or imaging unit) 6 in the document reader 200 is transmitted to a signal processor 120, processed by the signal processor 120, and converted to a write signal.

The image formation unit includes a cylindrical photosensitive body 110 as a latent image carrier having a photoconductivity, as well as a charge roller 111 serving as a charge unit, a developer 113, a transfer roller 114, and a cleaner 115 around the photosensitive body 110. The charge roller 111 serving as the charge unit can be replaced by a corona charger. The transfer roller 114 serving as a transfer unit can be replaced by a corona discharge roller.

An optical scanning device 117 that writes an image on the photosensitive body 110 by optical scanning in response to the write signal transmitted from the signal processor 120, optically scans the photosensitive body 110 between the charge roller 111 and the developer 113.

Reference symbol 116 denotes a fixing device, 118 denotes a cassette, 119 denotes a pair of resist rollers, 120 denotes a paper feed roller, 121 denotes a tray, and S denotes a transfer sheet serving as a recording medium.

During image formation, the photoconductive, photosensitive body 110 rotates clockwise at a constant velocity, a surface of the photosensitive body 110 is uniformly charged by the charge roller 111, and the surface is exposed when the optical scanning device 117 optically writes an image on the photosensitive body 110 using a laser beam. An electrostatic latent image is thereby formed. The electrostatic latent image thus formed is a so-called negative latent image, and an image part on the surface of the photosensitive body 110 is exposed.

This electrostatic latent image is subjected to reversal development by the developer 113, and a toner image is formed on the photosensitive body 110.

The cassette 118 that contains transfer sheets S is detachably attached to an image forming apparatus main body. While the cassette 118 is attached to the main body as shown in FIG. 11, an uppermost transfer sheet S among those contained in the cassette 118 is fed by the paper feed roller 120, and a tip end of the fed transfer sheet S is caught in the pair of resist rollers 119.

The pair of resist rollers 119 feed the transfer sheet S to a transfer unit at a timing at which the toner image on the photosensitive body 110 is moved to a transfer position. The toner image is superposed on the transfer sheet S thus fed by the transfer unit, and the toner image is electrostatically transferred onto the transfer sheet S by a function of the transfer roller 114.

The transfer sheet S onto which the toner image has been transferred is fed to the fixing device 116 that fixes the toner image onto the transfer sheet S, and is discharged onto the tray 121 by a pair of paper discharge rollers, not shown, via a transport path formed by a guide unit, not shown.

The surface of the photosensitive body 110 after the toner image is transferred onto the transfer sheet S, is cleaned by the cleaner 115, whereby a residual toner, a paper dust, and the like are removed from the surface of the photosensitive body 110.

Namely, the image forming apparatus shown in FIG. 11 writes the image signal, and forms the image corresponding to the image signal, and includes the document reader 200 according to the present invention, as the unit that converts the image of the document to the image signal.

Further, the writing of the image corresponding to the image signal is carried out by optical writing. The electrostatic latent image corresponding to the image to be formed is formed on the photoconductive, photosensitive body 110 by the optical writing.

As explained so far, the present invention can realize a novel document reading lens, a novel document reading lens unit, a novel document reader, and a novel image forming apparatus.

Moreover, the document reading lens according to the present invention can realize a wide angle of view having a half angle of view of 23 degrees or more and a good performance differently from the conventional art. Therefore, if the document reading lens having such a wide angle of view and the good performance is employed, the size of the document reader and that of the image forming apparatus using the document reading lens can be reduced. Further, it is possible to realize good document reading and good image formation by a good image signal obtained as a result of the good document reading.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A document reading lens for reading an image of a document, comprising:
   three positive lenses;
   three negative lenses;
   a diaphragm; and
   at least one cemented lens in which one of the positive lenses and one of the negative lenses are cemented together, wherein
   the document reading lens includes one or more aspherical surfaces,
   the lens adjacent to the diaphragm has the aspherical surface, and
   at least one cemented lens is arranged to be adjacent to the diaphragm.

2. The document reading lens according to claim 1, comprising
   the six lenses in four groups such that a first group including a first positive lens, a second group in which a second positive lens and a third negative lens are cemented together, and which has a negative refractive power as a whole, a third group including a fourth negative lens, and a fourth group in which a fifth negative lens and a sixth positive lens are cemented together, and which has a positive refractive power as a whole are sequentially arranged from an object side to an image side, wherein
   the diaphragm is arranged between the second group and the third group.

3. The document reading lens according to claim 2, wherein
   the first lens is a positive meniscus lens arranged to direct a convex surface to the object side, the second lens is a positive meniscus lens arranged to direct a convex surface to the object side, the third lens is a negative meniscus lens arranged to direct a convex surface to the object side, the fourth lens is a negative meniscus lens arranged to direct a concave surface to the object side, the fifth lens is a negative meniscus lens arranged to direct a concave surface to the object side, and the sixth lens is a positive meniscus lens arranged to direct a concave surface to the object side.

4. The document reading lens according to claim 2, wherein
   if a focal length of the first group relative to an e ray is f1, a combined focal length of the second group and the third group relative to the e ray is f23, and a combined focal length of a whole system relative to the e ray is f, the f1, the f23, and the f satisfy $0.9 < f1/f < 1.2$ and $-1.6 < f23/f < -1.1$.

5. The document reading lens according to claim 2, wherein
   if an average refractive index of the three positive lenses relative to a d ray is an n convex, and an average refractive index of the three negative lenses relative to the d ray is an n concave, the n convex and the n concave satisfy $-0.1 < n\ convex - n\ concave < 0.0$.

6. The document reading lens according to claim 2, wherein
   if an average Abbe number of the three positive lenses is a ν convex, and an average Abbe number of the three negative lenses is a ν concave, the ν convex and the ν concave satisfy $17.0 < \nu\ convex - \nu\ concave < 20.0$.

7. The document reading lens according to claim 1, wherein if a half angle of view in degrees is ω and an aperture efficiency is AE, the ω and the AE satisfy $$18.5 < \omega \times AE.$$

8. A document reading lens unit comprising:

a document reading lens integrally assembled with a lens barrel, the document reading lens including three positive lenses;

three negative lenses;

a diaphragm; and at least one cemented lens in which one of the positive lenses and one of the negative lenses are cemented together, wherein the document reading lens includes one or more aspherical surfaces, the lens adjacent to the diaphragm has the aspherical surface, and at least one cemented lens is arranged to be adjacent to the diaphragm.

9. A document reader for reading a document, comprising:

a document support unit that supports the document;

an illumination unit that illuminates the document supported by the document support unit;

a document reading lens that forms an image of the illuminated document, the document reading lens including three positive lenses;

three negative lenses;

a diaphragm; and at least one cemented lens in which one of the positive lenses and one of the negative lenses are cemented together, wherein the document reading lens includes one or more aspherical surfaces, the lens adjacent to the diaphragm has the aspherical surface, and at least one cemented lens is arranged to be adjacent to the diaphragm; and an imaging unit that receives the image of the document formed by the document reading lens, and that converts the image of the document to an electric signal.

10. The document reader according to claim 9, wherein the document support unit is a contact glass fixedly mounting thereon the document in a plane, the illumination unit includes a unit that illuminates the document mounted on the contact glass in a form of a slit, and that scans the document in a direction crossing a slit-like illuminated part, and the imaging unit is a line sensor.

11. The document reader according to claim 9, further comprising a color separation unit, wherein information on the document is read in full colors.

12. An image forming apparatus that writes an image signal and forms an image corresponding to the image signal, comprising a document reader that converts an image of a document to the image signal, the document reader including a document support unit that supports the document;

an illumination unit that illuminates the document supported by the document support unit;

a document reading lens that forms an image of the illuminated document, the document reading lens having three positive lenses;

three negative lenses;

a diaphragm; and at least one cemented lens in which one of the positive lenses and one of the negative lenses are cemented together, wherein the document reading lens includes one or more aspherical surfaces, the lens adjacent to the diaphragm has the aspherical surface, and at least one cemented lens is arranged to be adjacent to the diaphragm; and an imaging unit that receives the image of the document formed by the document reading lens, and that converts the image of the document to an electric signal.

13. The image forming apparatus according to claim 12, wherein writing of the image corresponding to the image signal is carried out by optical writing.

14. The image forming apparatus according to claim 13, wherein an electrostatic latent image corresponding to the image to be formed is formed on a photoconductive, photosensitive body by the optical writing.

* * * * *